Oct. 19, 1943.  E. R. BERGMANN  2,331,956
TROUGH SUPPORTING MEANS FOR SHAKER CONVEYERS
Filed May 22, 1942  2 Sheets-Sheet 1
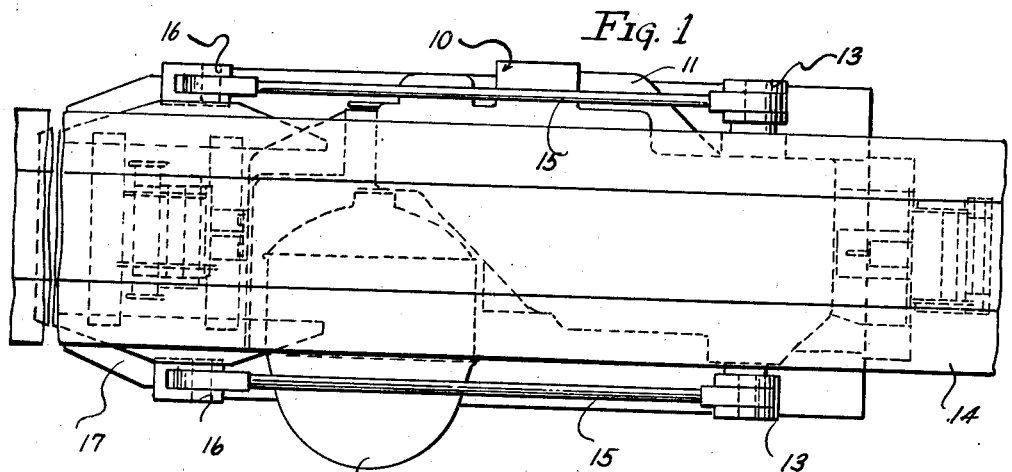
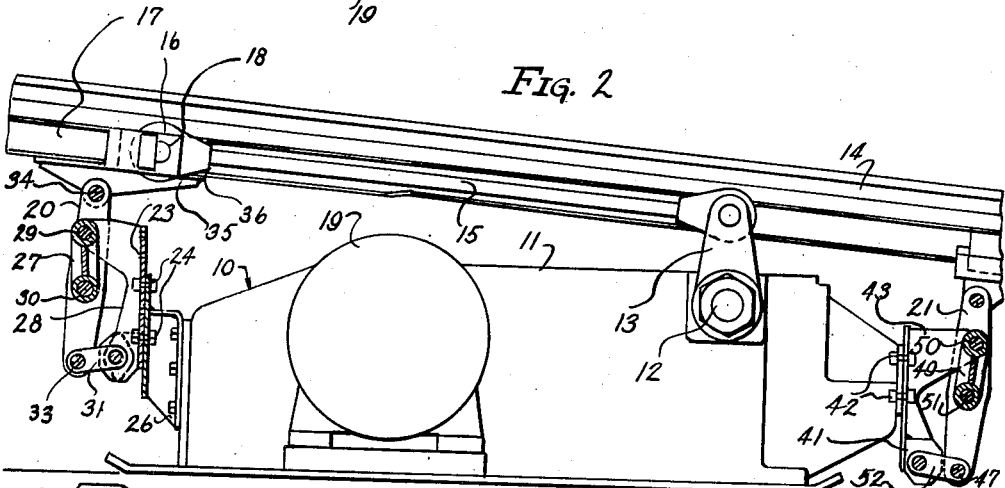
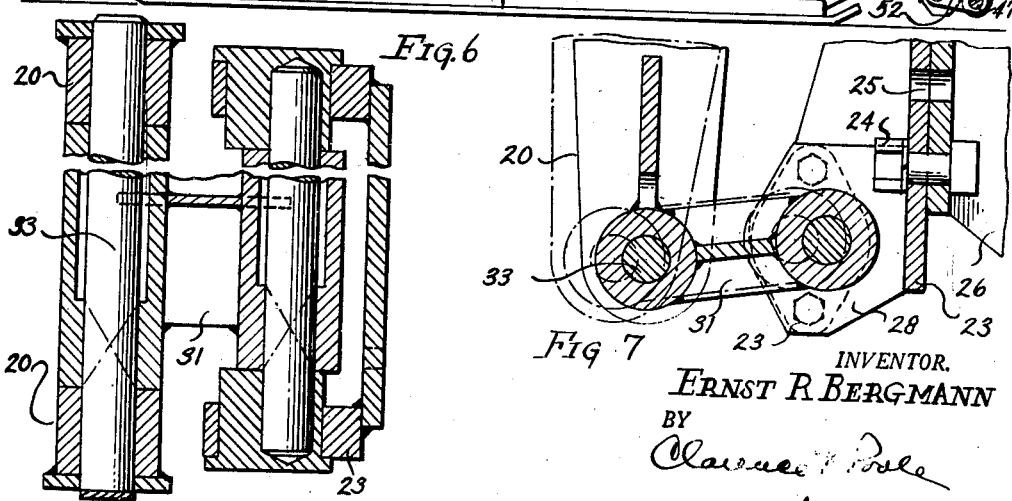
INVENTOR.
ERNST R. BERGMANN
BY
ATTORNEY Oct. 19, 1943.    E. R. BERGMANN    2,331,956
TROUGH SUPPORTING MEANS FOR SHAKER CONVEYERS
Filed May 22, 1942    2 Sheets-Sheet 2
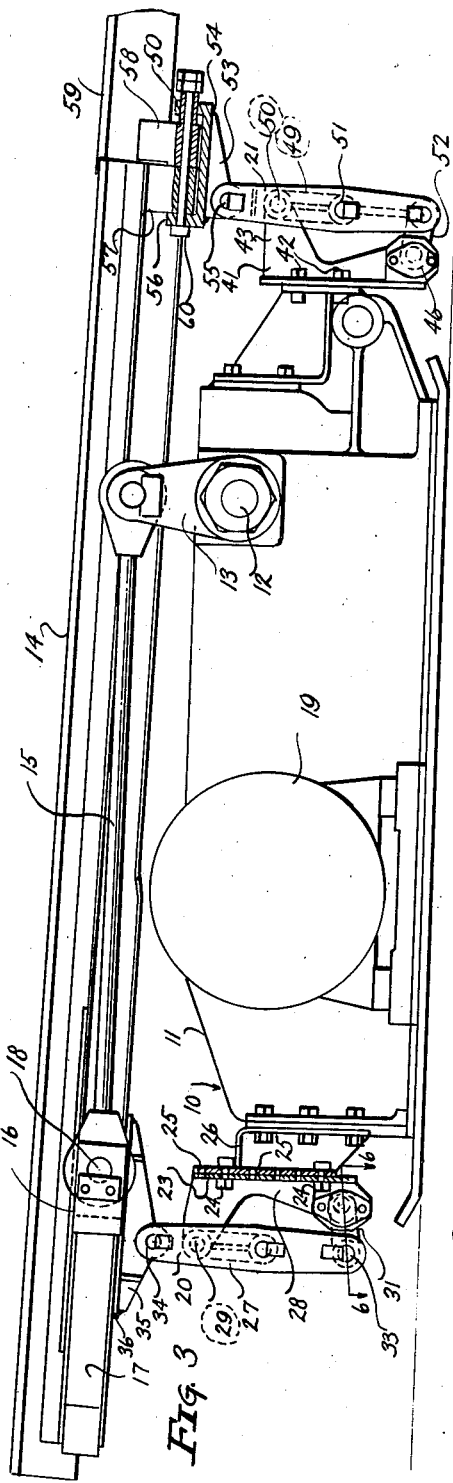
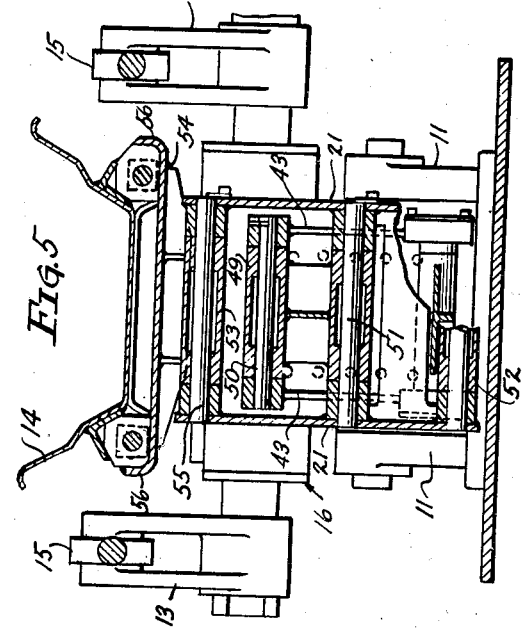
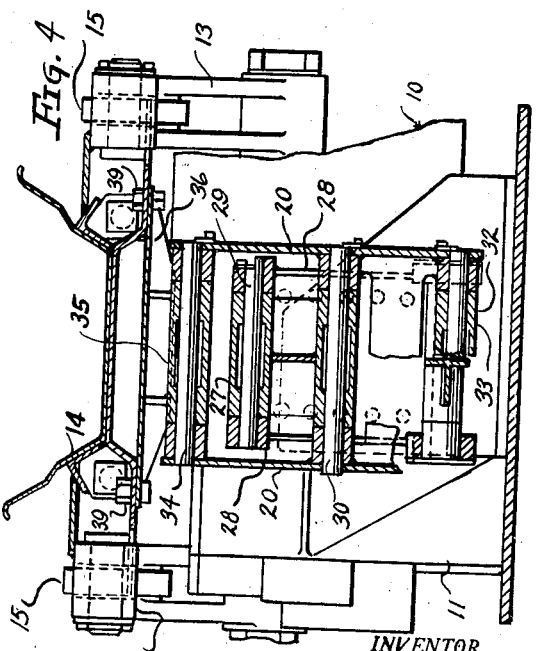
INVENTOR.
ERNST R. BERGMANN
BY
Clarence F. Poole
ATTORNEY Patented Oct. 19, 1943

2,331,956

UNITED STATES PATENT OFFICE 2,331,956

TROUGH SUPPORTING MEANS FOR SHAKER CONVEYERS

Ernst R. Bergmann, Evergreen Park, Ill., assignor to Goodman Manufacturing Company, Chicago, Ill., a corporation of Illinois Application May 22, 1942, Serial No. 444,048

9 Claims. (Cl. 198—220)

This invention relates to improvements in trough supporting means for shaker conveyers and more particularly relates to an improved trough support for supporting and guiding the driving trough section of a shaker conveyer for movement in a substantially straight line.

The principal objects of my invention are to provide a simplified and novel form of supporting and guiding means for a trough section of a shaker conveyer for supporting and guiding said trough section for reciprocable movement in a substantially straight line path which includes a simplified and effective form of straight line linkage supporting connection for the trough section.

Other objects of my invention will appear from time to time as the following specification proceeds and with reference to the accompanying drawings wherein:

Figure 1 is a top plan view of a shaker conveyer trough line mounted on a shaker conveyer drive mechanism in accordance with my invention;

Figure 2 is a view in side elevation of the device shown in Figure 1, with certain parts shown in longitudinal section;

Figure 3 is an enlarged view in side elevation of the device shown in Figure 1, with certain parts shown in longitudinal section and with the driving trough in a different position of vertical adjustment than in Figure 2;

Figure 4 is a transverse sectional view taken through the rear trough supporting means and looking towards the drive mechanism;

Figure 5 is a transverse sectional view taken through the front trough supporting means and looking towards the drive mechanism;

Figure 6 is an enlarged detail fragmentary sectional view taken substantially along line 6—6 of Figure 3; and Figure 7 is an enlarged detail fragmentary longitudinal sectional view, showing certain details of the linkage connection from the drive mechanism to the lower end of the supporting link.

In the drawings, a shaker conveyer drive mechanism generally indicated by reference character 10 is provided. Said drive mechanism may be of any usual type and is herein preferably shown as including a casing 11 having a rocking shaft 12 journaled therein, adjacent one end thereof, and projecting from opposite sides thereof. A pair of rocking arms 13, 13 are mounted on opposite ends of said shaft and are operatively connected with a driving trough 14 of a shaker conveyer trough line, by means of a pair of drive links 15, 15. Said drive links are pivotally connected between the free ends of said rocking arms and laterally projecting bifurcated ends 16, 16 of a transversely extending drive member 17 by means of transversely extending pivotal pins 18, 18. Said drive member is herein shown as being formed from a hollow box-like framework secured to the bottom and sides of said trough section and extending beneath and projecting laterally from opposite sides of said driving trough section and extending forwardly therealong for a short part of the length of said trough section.

A motor 19 is provided to oscillatively drive said rocking arms through a suitable reduction gearing and a suitable system of links and levers of a well known type. Said motor is herein preferably shown as being an electric motor of a well known form and said motor and gearing and linkage arrangement are not herein shown or described in detail since they form no part of my present invention.

The novel form of supporting connection for the driving trough 14 on the casing 11 for the shaker conveyer drive mechanism includes two pairs of laterally spaced trough supporting links 20, 20 and 21, 21, one pair of said laterally spaced links being supported adjacent one end of said casing and the other pair of said links being supported adjacent the other end of said casing.

A bracket 23, which forms a support for the links 20, 20, is detachably mounted on the rear end wall of the casing 11 for vertical adjustment with respect thereto, by means of nuts and bolts 24, 24 adapted to be selectively registered for engagement with any of a plurality of apertures 25, 25 formed in said bracket, and in a supporting member 26 therefor, which supporting member is secured to and projects rearwardly from the rear end wall of said casing.

The straight line supporting mounting for the trough supporting links 20, 20 on the bracket 23 includes a supporting link 27 pivotally mounted between the upper ends of a pair of laterally spaced supporting arms 28, 28 which form a part of and extend rearwardly from said bracket. Said link 27 is pivotally mounted between the upper projecting portions of said arms on a transverse shaft 29 and depends from said shaft. The outer sides of the lower end of said link abut the insides of the trough supporting links 20, 20, and said link is pivotally connected to said trough supporting links by means of a transverse shaft 30.

A control link 31 is pivotally connected between the lower portions of the arms 28, 28, for movement about a transverse axis. The free end of said last mentioned link is disposed between and is pivotally connected to the lower ends of the laterally spaced trough supporting links 20, 20 by means of a transverse shaft 33. The linkage connection just described affords a movable supporting connection for the laterally spaced trough supporting links 20, 20, which supports and guides the upper ends of said links for reciprocable movement in a substantially straight line path, parallel to the plane of inclination of the driving trough section of the conveyer, by reason of the fact that said depending links form a swinging support for said trough supporting links and the fact that said lower link serves to hold said trough supporting links in an upright position and serves as a fulcrum for said trough supporting links, movable vertically to conform to the arc of swinging movement of the link 27. The links 20 and 27 thus move together in oppositely disposed arcuate paths, the links 20 pivoting about the axis of the shaft 33 and the link 27 pivoting in an opposite arcuate path about the axis of the shaft 29 which is spaced a substantial distance above the axis of the shaft 33. Since the path of arcuate movement of said links is opposed and since the shaft 33 may move vertically to conform to the path of movement of the shaft 30, the resultant effect will be that the link 20 will pivot about the equivalent of a relatively long radius which may be of infinite length, giving a substantially straight line motion to the upper end of said link.

The supporting connection from the upper ends of the trough supporting links 20, 20 to the trough section 14 includes a transverse shaft 34, which pivotally connects said links to a depending portion 35 of a supporting member 36. Said supporting member, as herein shown, extends transversely of the trough section 14, and is secured to the bottom of the outer sides of the drive member 17 by means of nuts and bolts 39, 39 (see Figure 4).

The end of the casing 11 opposite from the bracket 23 has a bracket 41 detachably mounted thereon for vertical adjustment with respect thereto, by means of nuts and bolts 42, 42. Said bracket is provided with a pair of laterally spaced forwardly extending arms 43, 43 like the supporting arms 28, 28 of the bracket 23. The upper forwardly projecting ends of said arms have a depending supporting link 49, pivotally connected thereto, between said arms, on a transverse shaft 50. The lower end of said depending supporting link is disposed between and is pivotally connected to the forward trough supporting links 21, 21, intermediate the ends of said trough supporting links, by means of a transverse shaft 51. A control link 52 pivotally connects the lower ends of said trough supporting links with the lower ends of the arms 43, 43.

The upper ends of the trough supporting links 21, 21 are pivotally connected to a depending portion 53 of a trough supporting member 54, by means of a transverse shaft 55. Said trough supporting member extends transversely beneath the trough and is provided with side and forward and rear upwardly projecting end portions 56, 56, which extend upwardly along the ends and sides of abutting connecting eyes 57 and 58 of the trough 14 and of an overlapping trough section 59 (see Figure 3). Said eyes and trough sections are secured together by means of connecting bolts 60, 60 extending therethrough and through said upwardly projecting end portions.

The supporting connection for the trough section 14 and the next adjacent trough is thus such that when said trough section 14 is reciprocably driven by means of the rocking arms 13, 13 and the drive links 15, 15, it will be supported and guided by the supporting links 20, 20 and 21, 21, which are mounted and controlled for movement in a substantially straight line path.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a supporting means for a shaker conveyer trough section, for supporting said trough section for movement in a substantially straight line path, a pair of vertically spaced links mounted for pivotal movement about axes extending transversely of said trough section, and a reciprocably movable trough supporting link having pivotal supporting connection with said trough section adjacent its upper end and supported and guided by said vertically spaced links one of said vertically spaced links depending from its pivotal axis and both of said links having pivotal supporting and guiding connection with said trough supporting link at spaced apart points.

2. In a supporting means for a shaker conveyer trough section, for supporting said trough section for movement in a substantially straight line path, a trough supporting link having pivotal supporting connection with said trough section at its upper end, a depending supporting link mounted for swinging movement about a transverse axis and having pivotal connection with said first mentioned link intermediate its ends and forming a support therefor, and a control link mounted for pivotal movement about a transverse axis and pivotally connected to the lower end of said first link and forming a means for controlling reciprocable movement of said link.

3. In a means for supporting a shaker conveyer trough section for movement in a substantially straight line path, a pair of longitudinally spaced trough supporting links having pivotal supporting connection with said trough section, and means for supporting and controlling movement of each of said links for causing them to move in a substantially straight line path including two links connected with each link of said pair of links and pivoted for movement about vertically spaced transverse axes, and each set of said two links having supporting and controlling connection with one of said trough supporting links at vertically spaced apart points.

4. In a supporting means for a shaker conveyer trough section, for supporting said trough section to move in a substantially straight line path including a pair of longitudinally spaced trough supporting links having pivotal supporting connection with said trough section, and means for supporting each of said links for movement in a substantially straight line path including two vertically spaced links connected with each link of said pair of links and mounted for pivotal movement about axes extending transversely of said trough section, one of said links forming a supporting link for one of said trough supporting links and having pivotal connection with said trough supporting link intermediate the ends of said trough supporting link, and the other of said links forming a control link for one of said trough supporting links and having pivotal connection with the lower end of said associated trough supporting link.

5. In a supporting means for a driving trough section of a shaker conveyer and in combination with a shaker conveyer drive mechanism having a casing, drive means connecting said drive mechanism with said driving trough section, for reciprocably driving said trough section, and means for supporting said driving trough section on said casing for reciprocable movement in a substantially straight line path including a trough supporting link having supporting connection with said trough section, a pair of vertically spaced links pivotally connected to said casing and having connection with said trough supporting link at spaced apart points to form a controlled swinging support for said trough supporting link.

6. In a supporting means for a driving trough section of a shaker conveyer and in combination with a shaker conveyer drive mechanism having a casing, drive means connecting said drive mechanism with said driving trough section, for reciprocably driving said trough section, and means for supporting said driving trough section on said casing for reciprocable movement in a substantially straight line path including a trough supporting link supported adjacent each end of said casing, said links being pivotally connected to the bottom of said trough section for supporting said trough section for reciprocable movement in a straight line path, and the supporting connection between said casing and each of said links including a pair of vertically spaced links pivotally connected to said casing and having connection with said trough supporting link at spaced apart points, to form a controlled swinging support for said trough supporting link.

7. In a supporting means for a driving trough section of a shaker conveyer and in combination with a shaker conveyer drive mechanism having a casing, drive means connecting said drive mechanism with said driving trough section, for reciprocably driving said trough section, and means for supporting said driving trough section on said casing to move in a substantially straight line path including a bracket projecting from each end of said casing, each of said brackets having a link pivotally connected adjacent its upper end and depending therefrom and another link pivotally connected adjacent its lower end, and said links pivotally connected to said brackets having pivotal connection with a trough supporting link at spaced apart points therealong and forming a controlled swinging support for said trough supporting link so arranged as to cause its upper end to move in a substantially straight line path upon reciprocable movement thereof.

8. In a supporting means for a driving trough section of a shaker conveyer and in combination with a shaker conveyer drive mechanism having a casing, drive means connecting said drive mechanism with said driving trough section, for reciprocably driving said trough section, and means for supporting said driving trough section on said casing to move in a substantially straight line path including a trough supporting link having supporting connection with said trough section, a second link pivotally connected to said casing and mounted to depend from its pivotal axis and forming a swinging support for said trough supporting link, a pivotal connection from said second link to said first link, intermediate the ends of said first link, and a control link pivotally connected between the lower end of said trough supporting link and said casing.

9. In a supporting means for a driving trough section of a shaker conveyer and in combination with a shaker conveyer drive mechanism having a casing, drive means connecting said drive mechanism with said driving trough section, for reciprocably driving said trough section, and means for supporting said driving trough section on said casing to move in a substantially straight line path including a trough supporting link supported adjacent each end of said casing, said links being pivotally connected to the bottom of said trough section for supporting said trough section, and the supporting connection between said casing and each of said links including a link pivotally connected to said casing and mounted to depend from its pivotal axis and forming a swinging support for said trough supporting link, a pivotal connection from said second link to said trough supporting link intermediate the ends of said trough supporting link, and a control link spaced beneath said second link and pivotally connected between said casing and the lower end of said trough supporting link.

ERNST R. BERGMANN.